(12) United States Patent
Pivik (10) Patent No.: US 8,389,038 B2
(45) Date of Patent: Mar. 5, 2013

(54) METHOD FOR PREPARING A JERKY FOOD PRODUCT

(75) Inventor: Antone Pivik, Rock Springs, WY (US)

(73) Assignee: Wind River Jerky Corporation, Rock Springs, WY (US)

( * ) Notice: Subject to any disclaimer, the term of this patent is extended or adjusted under 35 U.S.C. 154(b) by 0 days.

(21) Appl. No.: 13/008,859

(22) Filed: Jan. 18, 2011

(65) Prior Publication Data

US 2011/0111106 A1 May 12, 2011

Related U.S. Application Data

(62) Division of application No. 11/280,572, filed on Nov. 15, 2005, now Pat. No. 7,870,820.

(51) Int. Cl.
*A47J 43/18* (2006.01)
*A21C 5/08* (2006.01)
*B26B 3/00* (2006.01)

(52) U.S. Cl. ........ 426/518; 426/517; 426/516; 426/513; 100/39; 100/41; 83/19; 83/21; 83/40

(58) Field of Classification Search ............ 99/430, 99/432, 439; 100/39, 41, 94, 98 R, 910; 30/114, 302, 303, 305; 83/932, 19, 21, 40; 425/306, 310, 298; 249/119, 129, 132, DIG. 1; 426/513, 516, 517, 518
See application file for complete search history.

(56) References Cited

U.S. PATENT DOCUMENTS

| | | | |
|---|---|---|---|
| 272,252 A | 2/1883 | Hellenbrand | |
| 1,112,991 A | 10/1914 | Dufner | |
| 1,116,408 A | 11/1914 | Gaebel | |
| 1,867,657 A | 7/1932 | Dellinger | |
| 2,223,828 A | 12/1940 | Larson | |
| 2,734,465 A * | 2/1956 | Head | 426/502 |
| 4,334,557 A | 6/1982 | YaSenka | |
| 4,342,242 A | 8/1982 | Schaum | |
| 4,362,497 A * | 12/1982 | Lifshitz | 425/510 |
| 4,516,923 A * | 5/1985 | Lifshitz et al. | 425/289 |
| 5,388,390 A * | 2/1995 | Finkowski et al. | 53/516 |
| 5,409,367 A * | 4/1995 | Lewandowski et al. | 425/298 |
| 5,731,029 A * | 3/1998 | Karwowski et al. | 426/646 |
| 6,401,605 B1 | 6/2002 | Repac et al. | |
| 6,645,063 B1 | 11/2003 | Volkl | |
| 6,780,000 B2 * | 8/2004 | Huszcz | 425/298 |
| 7,337,708 B2 | 3/2008 | Rothamel et al. | |
| 7,870,820 B2 | 1/2011 | Pivik | |
| 2005/0048189 A1 | 3/2005 | Lombard et al. | |
| 2006/0218799 A1 | 10/2006 | Kaposi | |

FOREIGN PATENT DOCUMENTS

WO  WO 02/064331  8/2002

* cited by examiner

*Primary Examiner* — Reginald L Alexander
(74) *Attorney, Agent, or Firm* — Thorpe North & Western LLP (57) ABSTRACT

A method and apparatus for preparing a jerky food product. The method comprises: (a) preparing a raw meat to obtain a moldable meat dough; (b) contacting at least a portion of the meat dough with a jerky mold apparatus having a pre-determined geometric configuration, wherein a plurality of sectors are spatially separated and defined by supported partitions arranged in a pre-determined pattern; (c) causing at least one of the partitions of the jerky mold to impale the meat dough to dispose portions of the meat dough into at least one of the sectors, thus separating the meat dough into a plurality of meat segments having a size and shape corresponding to that of the sectors; (d) removing the meat segments from the jerky mold; and (e) treating the meat segments to produce a plurality of jerky pieces.

21 Claims, 5 Drawing Sheets

METHOD FOR PREPARING A JERKY FOOD PRODUCT

CROSS REFERENCE TO RELATED APPLICATIONS

This application is a divisional application of U.S. application Ser. No. 11/280,572, filed Nov. 15, 2005, and entitled, "Method and System for Preparing a Jerky Food Product," which is incorporated by reference in its entirety herein.

FIELD OF THE INVENTION

The present invention relates generally to food preparation products and methods, and more particularly to a jerky mold and a method and system for preparing a jerky food product using the jerky mold.

BACKGROUND OF THE INVENTION AND RELATED ART

Jerky food products are a popular food item enjoyed by consumers, with the most popular type most likely being beef jerky. Jerky food products date back several years where people slowly cured, smoked and dried meat in order to ensure nourishment during hard times and winter months. An effective method or preserving meat for an extended period of time, the during and smoking process was used on foods such as venison, buffalo, and elk. To increase palatability and flavor, some rubbed berries onto the jerky prior to drying to produce a tangy jerky known as Pemmican. Others treated their meat with spices and other flavorful foods. Cured in smoke houses and slowly dried over an open fire, jerky products quickly became a staple food item. These products have only increased in popularity with the vast improvements made to production methods. Today, while jerky food products are produced in large scale quantities, there are still many who enjoy producing homemade jerky.

The manufacture of jerky food products on a large scale is accomplished using a variety of different methods. In one conventional method, jerky food products are prepared and produced in mass quantities by cutting large slabs of prepared meat dough. As part of the process, the basic materials desired for forming the jerky are first ground to a selected consistency. Different components may be ground to different degrees of coarseness in order to form a more desirable consistency in the finished jerky product. After the jerky components are ground, they are blended with suitable curing agents or seasonings. After the components are ground and suitably cured or seasoned, the mix is then prepared in slabs having a thickness of from about one to one and one-half inches. The slabs are then deposited in a freezing chamber and allowed to remain there until frozen or sufficiently chilled to permit them to be cut into thin slices.

After the slabs of jerky are suitably chilled or frozen, they are removed from the freezer and cut into thin slices having as uniform a thickness as possible. The thin slices of frozen jerky are then deposited upon a conveyor and carried through a drying chamber. Either before or after entry of the jerky slices into the drying chamber, they commence to thaw and, after thawing, remain in the drying chamber until sufficient moisture is removed from the slices so that they may be stored at room temperature for extended periods of time. If desired for purposes of imparting additional flavoring or for preservation of the jerky, the slices may also be smoked, which smoking may be accomplished within the drying chamber. After the jerky slices are dried, and smoked, if desired, they are removed from the drying chamber and conveyed to a suitable packaging station where the jerky is prepared for sale.

One problem associated with preparing or producing a jerky product using this particular method is that it is time consuming. During the chilling or freezing stage, much time is needed to properly chill the slabs of meat dough, which can be rather thick. In addition, this extra step can be expensive, both in terms of equipment costs, as well as in labor costs as the entire duration of the process is lengthened.

In another, more modern, conventional method for large scale production, jerky food products are produced using a rotary mold. In this process, a meat dough is formed and cooled. Formation of the individual jerky pieces is preferably done by first sheeting the dough prior to its delivery to the rotary molder. The sheeting may be performed between counter rotating rollers or by other methods. The sheet may then be fed to the rotary molder, which forms pieces in a desired shape. The rotary molder generally comprises a rotating feeding drum or roll that is corrugated or provided with a plurality of ribs for feeding purposes. Positioned adjacent to the feeding drum is a rotary molding drum or roll. The rotary molding drum may be provided with a plurality of molding cavities positioned in a particular arrangement about the surface of the drum. Positioned beneath the rotary molding drum is a pressing drum or forming roll. A continuous conveyor is supported and fed between the rotary molding drum and the pressing drum. The continuous conveyor functions to receive the jerky pieces leaving the rotary molding drum.

In still another conventional method for large scale production, jerky food products are produced using an extrusion process, wherein the jerky products are formed by cutting or slicing an extruded meat dough. However, the step of slicing typically requires that the extruded meat dough be in a solid or semi-solid state, which may be achieved by first chilling or freezing the meat dough. Although this helps to facilitate accurate slicing, this is a time consuming and costly step in the process.

In addition to the inherent problems described above, commercial methods for producing jerky food products, while suitable for large scale production, offer little or no corresponding practical application for residential use, except perhaps for the method describing the cutting of frozen slabs of meat dough. However, as mentioned above, producing homemade jerky products is a popular practice participated in and enjoyed by millions of people worldwide. These people include farmers, hunters, fisherman, campers, and other outdoor enthusiasts, as well as others simply desiring to include jerky as part of their selection of foods. Mixing up batches of curing spices and drying meat in the oven or in dryers, consumers find that homemade jerky products are much more flavorful and fresh as opposed to their packaged, store-bought counterparts.

Typical homemade jerky products are produced by first cutting meat into large slabs and then freezing the slabs. Once frozen, the meat slabs may be cut into thin slices using a knife or power slicer. Once the meat is in slices, the meat can then be cured, dried, and cooked to obtain a jerky food product using conventional ovens, dehydrators, and dryers. Alternatively, some grinders and extruders are available for home use, giving consumers the option to produce a meat dough. However, this still requires the meat dough to be in a solid or semi-solid state to facilitate cutting.

SUMMARY OF THE INVENTION

In light of the problems and deficiencies inherent in the prior art, the present invention seeks to overcome these by providing an efficient method for producing a jerky food product, whether for human or animal consumption, wherein the method is particularly suited for home users, but may also be adapted for commercial use in the production of large scale quantities of jerky food products. The method utilizes a jerky mold configured to eliminate the need for freezing or chilling the meat prior to forming the slices. The jerky mold provides a way to form jerky pieces into various sizes and shapes without cutting or slicing.

In accordance with the invention as embodied and broadly described herein, the present invention features a method for preparing a jerky food product, the method comprising: (a) preparing a raw meat to obtain a moldable meat dough; (b) contacting at least a portion of the meat dough with a jerky mold having a pre-determined geometric configuration, wherein a plurality of sectors are spatially separated and defined by supported partitions arranged in a pre-determined pattern; (c) causing at least one of the partitions of the jerky mold to impale the meat dough to dispose portions of the meat dough into at least one of the sectors, thus separating the meat dough into a plurality of meat segments having a size and shape corresponding to that of the sectors; (d) removing the meat segments from the jerky mold; and (e) treating the meat segments to produce a plurality of jerky pieces.

In one exemplary embodiment, the method further comprises compressing the meat dough to cause the meat dough to be packed into and to fill the sectors, wherein the meat segments are caused to have a size and shape corresponding to that of the sectors.

The present invention also features a method for facilitating the preparation of a jerky food product, the method comprising: (a) arranging a plurality of partitions in a predetermined pattern to form a plurality of spatially separated sectors, the partitions being configured to impale a moldable meat dough; (b) supporting the partitions to form a jerky mold; and (c) configuring the jerky mold to receive the meat dough and to be used to form a plurality of meat segments to be treated to produce a plurality of jerky pieces.

The present invention further features a jerky mold configured to facilitate the preparation of a jerky food product, the jerky mold comprising: (a) a plurality of interconnected partitions supported within the perimeter boundary, each of which partitions have an upper surface configured to impale a moldable meat dough and opposing edges; and (b) a plurality of sectors spatially separated from one another and having a pre-determined configuration and defined by the partitions being arranged in a pre-determined pattern, the sectors being configured to receive a portion of the meat dough therein, thus separating the meat dough into a plurality of meat segments having a size and shape corresponding to that of the sectors.

In one exemplary embodiment, the jerky mold may further comprise a backing attached to the partitions. The backing may be configured to back one side of the partitions and to contain the meat dough in the sectors upon being received therein. In this embodiment, the backing is part of the jerky mold. In another exemplary embodiment, a support surface, such as a countertop or table, may be used to back the partitions.

The jerky mold may further comprise means for facilitating the removal of the meat segments from each sector. In one exemplary embodiment, means for facilitating comprises a tapering configuration formed on the edges or faces or sides of the partitions.

The present invention still further features a system for preparing a jerky food product, the system comprising: (a) a jerky mold having a pre-determined geometric configuration, wherein a plurality of sectors are spatially separated and defined by partitions arranged in a pre-determined pattern; (b) means for causing at least one of the partitions of the jerky mold to impale a moldable meat dough to dispose portions of the meat dough into at least one of the sectors, thus separating the meat dough into a plurality of meat segments having a size and shape corresponding to that of the sectors; (c) a screen configured to receive and support the meat segments and to facilitate air convection therethrough; and (d) means for treating the meat segments as supported by the screen.

In one exemplary embodiment, means for causing comprises a rolling pin configured to supply pressure to said meat dough, thus causing the partitions to impale the meat dough, and further, to compact or compress the meat dough to cause it to be packed into and to fill the sectors. In another exemplary embodiment, means for causing may comprise a pressure platen, or other similar flat plate capable of supplying pressure to the meat dough or the partitions.

In one exemplary embodiment, means for treating comprises anyone, or combination, of marinating, drying, cooking, curing, and processing.

The present invention jerky mold may further be adapted for use within a mass-production system, wherein a large-scale quantity of jerky food products are produced in accordance with the methods described herein, as well as other similar obvious methods.

BRIEF DESCRIPTION OF THE DRAWINGS

The present invention will become more fully apparent from the following description and appended claims, taken in conjunction with the accompanying drawings. Understanding that these drawings merely depict exemplary embodiments of the present invention they are, therefore, not to be considered limiting of its scope. It will be readily appreciated that the components of the present invention, as generally described and illustrated in the figures herein, could be arranged and designed in a wide variety of different configurations. Nonetheless, the invention will be described and explained with additional specificity and detail through the use of the accompanying drawings in which:

FIG. 4-A illustrates a cut-away cross-sectional side view, as taken along line A-A in FIG. 1, of a section of an impaler of a jerky mold according to another exemplary embodiment of the present invention, wherein the partitions comprise linear, inwardly tapering edges;

FIG. 4-B illustrates a detailed view of the upper surface portion of the partition identified in FIG. 4-A;

DETAILED DESCRIPTION OF EXEMPLARY EMBODIMENTS

The following detailed description of exemplary embodiments of the invention makes reference to the accompanying drawings, which form a part hereof and in which are shown, by way of illustration, exemplary embodiments in which the invention may be practiced. While these exemplary embodiments are described in sufficient detail to enable those skilled in the art to practice the invention, it should be understood that other embodiments may be realized and that various changes to the invention may be made without departing from the spirit and scope of the present invention. Thus, the following more detailed description of the embodiments of the present invention, as represented in FIGS. 1 through 6, is not intended to limit the scope of the invention, as claimed, but is presented for purposes of illustration only and not limitation to describe the features and characteristics of the present invention, to set forth the best mode of operation of the invention, and to sufficiently enable one skilled in the art to practice the invention. Accordingly, the scope of the present invention is to be defined solely by the appended claims.

The following detailed description and exemplary embodiments of the invention will be best understood by reference to the accompanying drawings, wherein the elements and features of the invention are designated by numerals throughout.

The present invention describes a method and device for producing or preparing a jerky food product using a jerky mold configured to be more efficient than and to simplify current and conventional methods. The present invention provides several significant advantages over prior related methods and devices, some of which are recited here and throughout the following more detailed description. First, the jerky mold facilitates the formation of pre-determined sized and shaped meat segments that can subsequently be treated to produce a jerky food product. Second, various steps in current preparation methods are eliminated, such as the step of freezing the meat or meat dough in order to facilitate slicing into thin strips of meat, which are then further treated to form a jerky food product.

Each of the above-recited advantages, and any others recited or suggested herein, will be apparent in light of the detailed description set forth below, with reference to the accompanying drawings. These advantages are not meant to be limiting in any way. Indeed, one skilled in the art will appreciate that other advantages may be realized, other than those specifically recited or suggested herein, upon practicing the present invention.

Preliminarily, the term "meat dough" or "moldable meat dough," as used herein, shall be understood to mean a moldable meat composition prepared from raw meat, wherein the moldable meat composition comprises a dough-like consistency. To obtain the moldable composition, raw meat may comminuted to obtain a desired particle size or consistency. One exemplary way of comminuting or otherwise preparing the raw meat is feeding the raw meat through a grinder configured to grind and extrude the raw meat.

The raw meat used in the present invention may be any edible meat suitable for human consumption or consumption by canines. The meat may be non-rendered, non-dried, raw meat, raw meat products, raw meat by-products, and mixtures thereof. Whole meat pieces and comminuted or ground meat may be used in embodiments of the invention. Beef, chicken, and turkey are preferred meats for making jerky products intended for human consumption. For jerky products intended as pet foods, muscle meat, mechanically deboned beef, mechanically deboned chicken, and emulsified chicken are preferred.

Examples of meat which may be used include, but are not limited to, beef, veal, pork, and horsemeat, and the fleshy tissue from antelope, bison, cows, deer, elk, and the like. Poultry meat which may be used includes chicken, turkey, duck, or goose and the like. Embodiments of the invention may also utilize the flesh of fish and shell fish. Meat includes striated muscle which is skeletal or that which is found, for example, in the tongue, diaphragm, heart, or esophagus, with or without accompanying overlying fat and portions of the skin, sinew, nerve and blood vessels which normally accompany the meat flesh. Examples of meat by-products are organs and tissues such as lungs, spleens, kidneys, brain, liver, blood, bone, partially defatted low-temperature fatty tissues, stomachs, intestines free of their contents, and the like. Poultry by-products include nonrendered clean parts of carcasses of slaughtered poultry such as heads, feet, and viscera, free from fecal content and foreign matter.

Meat meal and bone meal may optionally be used in combination with the meat or meat by-products in embodiments of the present invention. The meat meal and bone meal provide taste and water absorption properties.

The meat dough may also be prepared with various ingredients to improve the taste of the jerky food product, to help preserve the jerky food product, or for other known purposes. For instance, the meat dough may comprise one or more binding agents, such as a starch, a gum, or combinations thereof, to compensate for the reduction in binding power in the event the meat protein is cooked or denatured.

The meat dough may also comprise one or more humectants, which may be used to bind water, provide flexibility, enhance palatability, and augment microbial shelf stability with respect to the jerky food products. Examples of suitable humectants include, but are not limited to, humectant sugars—fructose, lactose, dextrose, maltose, galactose, sorbose, mannose, maple syrup, corn syrup, invert syrups, high fructose corn syrups, honey, molasses; non-sugar humectancts—glycerol, mannitol, maltitol, xylitol, sorbitol, and various polyols.

The meat dough may also comprise one or more fillers, such as soy flour, wheat germ, corn grits, soy grits, wheat gluten, textured soy protein, soy isolates, soy concentrates, albumin, and combinations thereof.

The meat dough may also comprise one or more seasonings and/or flavorings, examples of which include, but are not limited to, salts, garlic, cloves, onion, chili pepper, black pepper, sweet basil, bay leaf, marjoram, parsley, sage, rosemary, thyme, cheese, eggs, bacon, bacon flavoring, fish flavoring, poultry flavoring, liquid smoke flavoring, monosodium glutamate, and combinations of these.

The meat dough may also comprise one or more preservatives and/or curing agents, examples of which include, but are not limited to, salt, benzoic acid, the sodium or salts of benzoic acid, the calcium or salts of propionic acid, sorbic acid, the potassium, calcium, sodium and other salts of sorbic acid, diethyl pyrocarbonate and menadione sodium bisulfate, sodium nitrate, and sodium nitrite. Various commercial curing products may also be used, such as the various curing products from Morton Salt.

The term "meat segment," as used herein, shall be understood to mean a segment of meat as formed from the meat dough being impaled by the impaler and received, or otherwise packed, into one of the sectors in the jerky mold. The meat segments are those portions of meat dough that are formed in the jerky mold, removed, and treated to form or produce a jerky food product.

Generally speaking, the jerky mold comprises a plurality of interconnected, supported partitions having an upper surface configured to impale a moldable meat dough and opposing edges. The jerky mold further comprises a plurality of sectors spatially separated from one another and having a pre-determined configuration and defined by the partitions being arranged in a pre-determined pattern. The sectors are configured to receive a portion of the meat dough therein, thus separating the meat dough into a plurality of meat segments having a size and shape corresponding to that of the sectors. The jerky mold, and its component parts, are configured to be comprised of materials or finishes that are food compatible, and that are preferably easy to clean.

Figure 1:
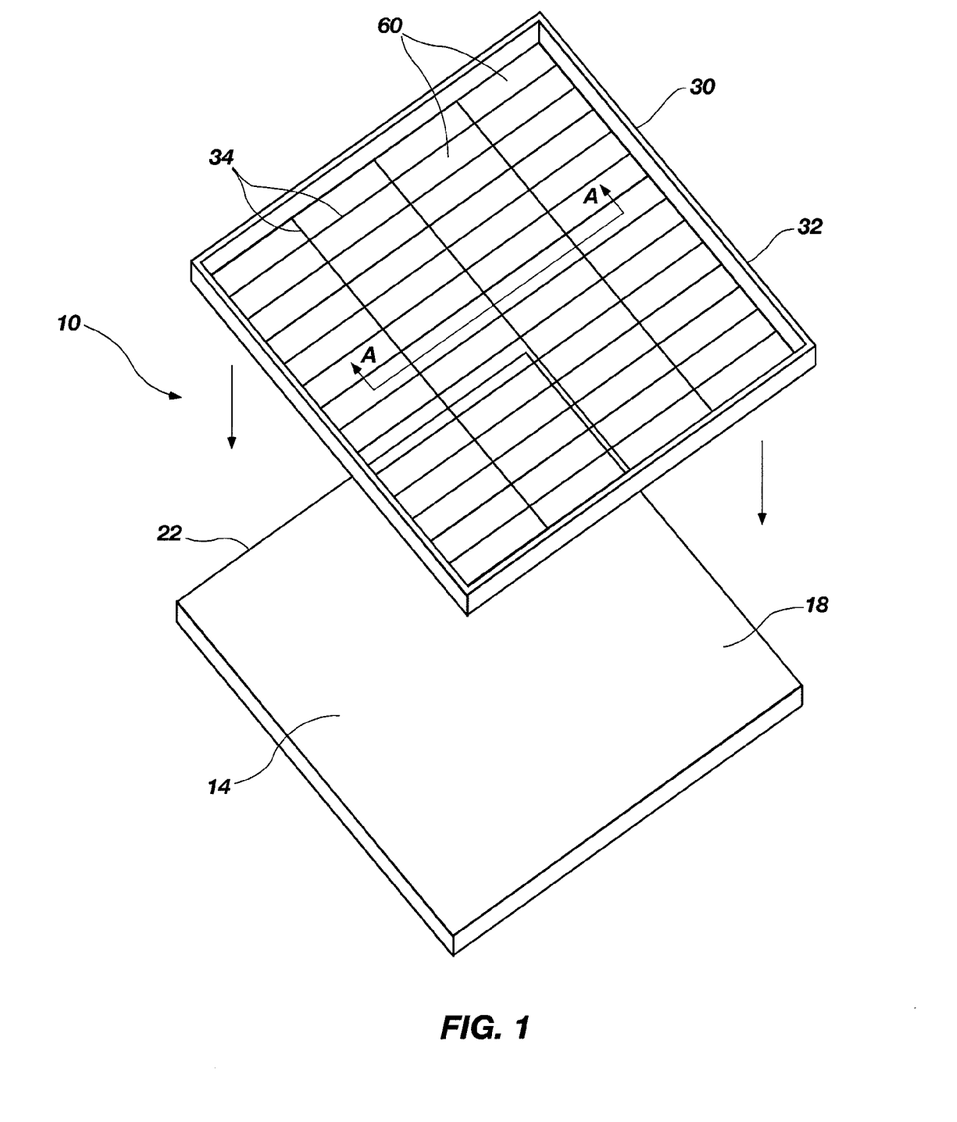
FIG. 1 illustrates a perspective view of a jerky mold according to one exemplary embodiment of the present invention.

With reference to FIG. 1, illustrated is a perspective view of a jerky mold according to one exemplary embodiment of the present invention, wherein the jerky mold may be considered and function as a compression mold, as explained in greater detail below. In this particular embodiment, the jerky mold 10 comprises a backing 14, and an impaler 30. The jerky mold 10, and its components, comprise a pre-determined geometric configuration depending upon the particular size, shape, and number of meat segments and resulting jerky food products being prepared. By pre-determined geometric configuration, it is meant that the various components or elements comprising the jerky mold have a pre-determined size and shape.

In one exemplary embodiment, the backing 14 comprises a solid piece of material, or at least a structure having a flat, solid upper surface, typically made of a metal or non-metal that is food compatible, and that is preferably easily cleaned. The backing 14 is shown as having a flat, upper surface 18 and a perimeter 22, giving the backing a thickness. The backing 14 is sized and configured to couple or attach to the impaler 30 and to support the various components of the impaler 30 in one or more ways. The backing 14 may couple or attach to the impaler 30 using any known attachment means in the art, such as welding, a snap fit, an interference fit, and others.

The backing 14 is sized and configured to provide a boundary for each of the sectors 60 formed in the impaler 30. In other words, the backing 14 is configured to contain the meat segments in the sectors 60 once formed by depositing the meat dough therein. Indeed, once attached to the impaler 30, the backing 14 closes off the sectors 60 so that no meat dough is able to pass therethrough. This feature becomes advantageous when the meat dough is caused to be received into one or more of the sectors 60, and particularly when the meat dough is being packed into the sectors 60 under pressure.

In another exemplary embodiment, the backing 14 may comprise an independent structure or surface over which the impaler 30 is laid, in which case the jerky mold 10 would consist primarily of the impaler 30 structure and use of the backing 14 would constitute a system for producing a jerky food product using the jerky mold 10. For instance, in one aspect, the backing 14 may comprise a countertop having a flat upper surface. In another aspect, the backing 14 may comprise a conveyor belt or other mass manufacturing object over which the impaler 30 may be laid. In any event, the backing is configured to provide a boundary to the jerky mold 10 to prevent the meat dough, and the corresponding meat segments formed therefrom, from passing undesirably through the sectors 60.

The backing 14, depending upon its configuration, may further be removable. A removable backing may aid in removing the various meat segments from the sectors 60. In addition, a removable backing may aid in cleaning and storing the jerky mold 10.

The impaler 30 functions to impale the meat dough to cause portions thereof to be received into the various one or more sectors 60 defined in the impaler 30, thus creating or causing to be formed resulting meat segments that take the size and form or shape of the sectors 60. In the exemplary embodiment shown, the impaler 30 is shown as a comprising a pre-determined geometric configuration in the form of a grid-type configuration, wherein the sectors 60 are of equal size and shape. More specifically, the impaler 30 comprises a plurality of partitions 34 having a thin profile design, thus enabling them to impale the meat dough. The partitions 34 are configured to define the several sectors 60 in the jerky mold 10, each of which are spatially separated from one another according to a pre-determined arrangement and function to contain the meat segments therein. In addition, the partitions 34 are configured to function as lateral and longitudinal boundaries to isolate the meat segments from one another, and to prevent their unwanted movement within the jerky mold 10. As shown, the partitions 34 comprise several lateral and longitudinal structures intersecting one another at predetermined locations in order to form a plurality of sectors 60 arranged in multiple rows and columns. In this configuration, the sectors 60 comprise long, narrow, and thin configurations that are capable of producing meat segments, and therefore jerky food products, of similar size and shape.

In other exemplary embodiments, the impaler 30 may comprise partitions defining a plurality of arbitrarily shaped sectors, or sectors taking on various fun or festive shapes. For example, the sectors 60 may comprise shapes corresponding to a holiday, a special event, a season, or anything else desired. As such, the partitions 34 may comprise linear or nonlinear configurations, or both. In any event, from a manufacturing standpoint, the partitions 34 may be arranged to comprise any pattern, shape, or design.

Although optional, FIG. 1 also illustrates the impaler 30 as comprising a perimeter 32 functioning as an outer boundary for the impaler 30 and the outermost sectors 60. The perimeter may comprise support characteristics to provide torsional, shear, and other support to the jerky mold 10. The perimeter 32 may also provide a way to easily grasp and handle or manipulate the impaler 30 by comprising a bulky or robust configuration.

The impaler 30, and particularly the partitions 34, and the perimeter 32 if present, are configured to support and withstand a compression force caused by impaling the meat dough. Indeed, as the meat dough is brought into contact with the partitions for the purpose of forming one or more meat segments, the partitions are caused to impale the meat dough in order to cause the meat dough to be received into and to fill the several sectors 60. In order to do this, a sufficient amount of force or pressure is applied to either the meat dough or the impaler 30, or both, to cause the partitions to impale and to separate the meat dough. During this, the partitions 34 must be able to withstand the amount of force being applied so that they do not buckle or collapse. In addition, the partitions 34 should be strong enough so as to prevent deformation of the sectors 60 as the meat dough is received therein, or is caused to be disposed or to fill the sectors 60, especially in the event the meat dough is packed into the sectors 60 under pressure.

In one exemplary embodiment, the partitions are formed of a metal material, particularly stainless steel. Other metal or non-metal materials may be used, such aluminum, durable plastics, etc., as long as the partitions comprise a suitable size and shape to prevent deformation of the jerky mold 10 under applied pressure.

Providing the jerky mold 10 with a pre-determined geometric configuration is intended to mean that the various components or elements comprising the jerky mold 10 have a pre-determined size and shape. For example, the partitions 34 used to define the sectors 60 may be arranged in a certain pattern and may comprise a certain height, pattern, and wall thickness. As such, the sectors 60 defined by the partitions 34 may also have a certain size and shape. Providing the jerky mold 10 with a pre-determined geometric configuration further allows different jerky molds to comprise different sizes and shapes. For instance, the thickness, length, width, or shape of the jerky pieces produced may vary depending upon the particular jerky mold used to create them.

Figure 2:
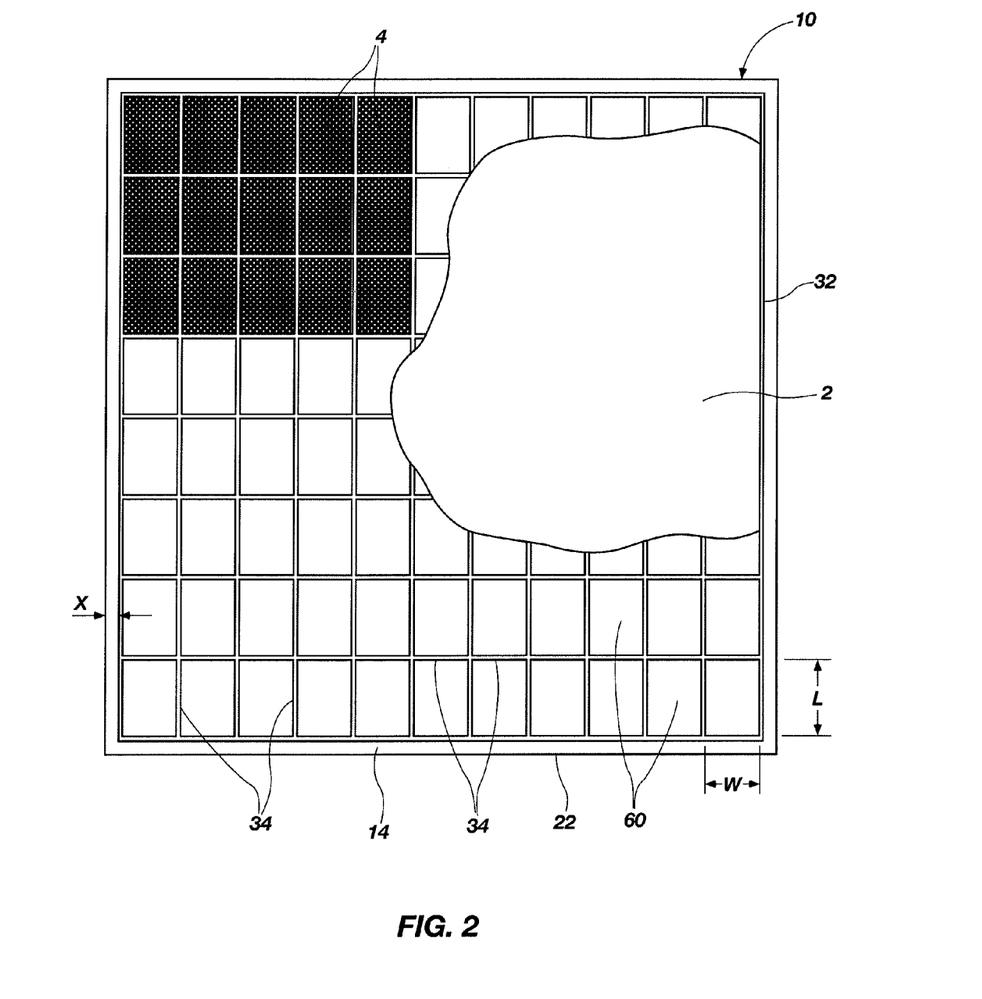
FIG. 2 illustrates a top view of the jerky mold of FIG. 1, with meat dough filled in some of the sectors of the jerky mold.

With reference to FIG. 2, illustrated is a jerky mold 10 having a backing 14 attached or coupled thereto. The jerky mold 10 is configured in a similar manner as the jerky mold 10 shown in FIG. 1, in that it comprises a grid-like design with the impaler 30 comprising a plurality of intersecting partitions 34 defining a plurality of long, narrow sectors 60 having a length L and a width W. As shown, the backing 14 comprises a perimeter 22 that is slightly larger than or that extends outward a distance x from the perimeter 32 of the impaler 30. FIG. 2 further illustrates a meat dough 2 in contact with the impaler 30, and more particularly, overlaid upon the top or upper surface of the impaler 30. The meat dough 2 may be subjected to a compression force causing the partitions 34 to impale the meat dough, thus causing at least a portion of the meat dough to be received into and to fill one or more of the sectors 60. As shown, a plurality of meat segments 4 are formed by causing the meat dough to fill and to be packed into the corresponding sectors 60. The meat segments 4 are shown as still being disposed within and defined by the sectors 60, with any excess meat dough removed. A sufficient amount of meat dough may be obtained to fill each of the sectors 60 in the jerky mold 10.

Figure 3:
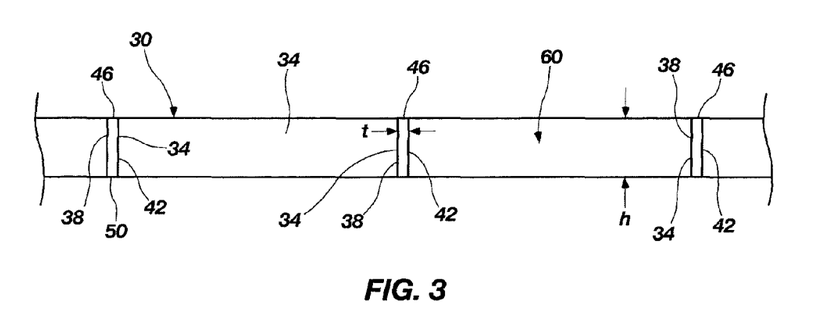
FIG. 3 illustrates a cut-away cross-sectional side view, as taken long line A-A in FIG. 1, of a section of an impaler of a jerky mold according to one exemplary embodiment of the present invention, wherein the partitions comprise linear, parallel edges.

With reference to FIG. 3, illustrated is a cut-away cross-sectional side view, as taken long line A-A in FIG. 1, of a section of an impaler 30 of a jerky mold according to one exemplary embodiment of the present invention. In this particular embodiment, the partitions 34 comprise opposing linear, parallel edges. More specifically, the partitions 34 comprise a first side 38, a second side 42, an upper surface 46, and a lower surface 50. The first and second sides 38 and 42, respectively, are formed parallel to one another and comprise a height h and a thickness t. The height h of the partitions 34 may be any desired height, which will dictate the thickness of the meat segments in the sectors 60 and the final jerky food product. The thickness t of the partitions may also be any desired thickness. The thickness t will dictate the amount of meat dough impaled, or rather the cut size in the meat dough caused by the partitions 34.

Figure 4:
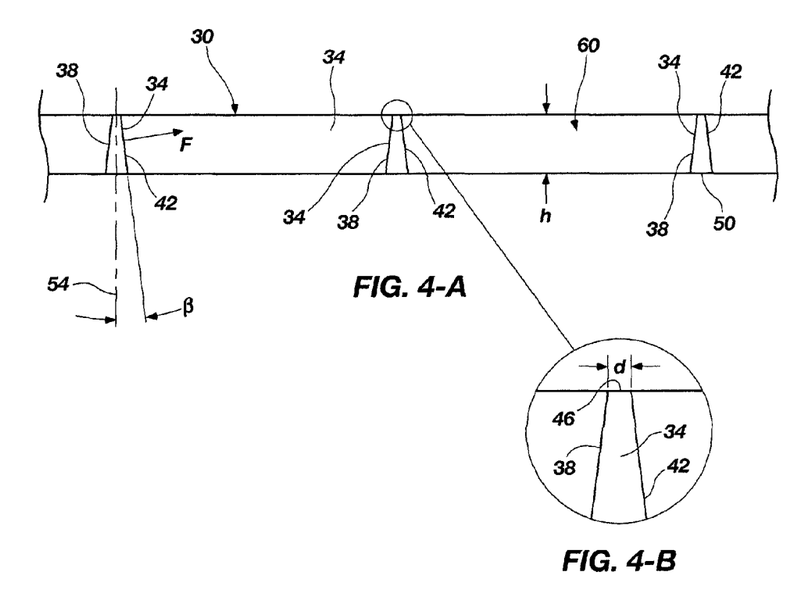

With reference to FIG. 4-A, illustrated is a cut-away cross-sectional side view, as taken along line A-A in FIG. 1, of a section of an impaler of a jerky mold according to another exemplary embodiment of the present invention. In this particular embodiment, the partitions 34 comprise opposing linear, inwardly tapering edges. More specifically, the partitions 34 comprise a first side 38, a second side 42, an upper surface 46, and a lower surface 50. The first and second sides 38 and 42, respectively, are formed at an incline with respect to one another so that the upper surface 46 comprises a smaller distance across, or smaller distance as measured from the first side 38 to the second side 42, than the lower surface 50. The angle of inclination of each of the opposing first and second sides 38 and 42, respectively, shown as angle β, which is measured from a central axis 54, may comprise any angle. Preferably however, the angle of inclination will be between 1 and 30 degrees.

Advantageously, the tapered sides provide one exemplary means for facilitating the removal of the meat segments from the several sectors of the jerky mold. Indeed, as the meat dough is caused to be received within the sectors 60, particularly under compression where the meat dough is packed into the sectors 60, it may be difficult to remove the meat segments from the jerky mold for further processing or treatment. As such, the present invention contemplates means for facilitating the removal of the meat segments from the jerky mold, and particularly the sectors of the jerky mold. The tapered configuration of the partitions 34 functions to assist in removing the meat segments from the jerky mold by orienting the vector of the normal force (shown as normal force F in FIG. 4-A) acting on the sides of the meat segments from the partitions to be on an incline rather than parallel with the surface of the meat segments. This effectively reduces the forces acting on the meat segments from the partitions as the meat segments begin to break free from the jerky mold. Stated another way, the tapered configuration enables the time the surfaces of the meat segments are in contact with the partitions to be significantly reduced once the meat segments begin to break free from the jerky mold. Indeed, the meat segments are not required to slide along the entire surface of the partitions to be removed as they would with the partitions as configured in FIG. 3. Rather, the tapered configuration causes the meat segments to only be in contact with the partitions for a brief time, even if still mostly contained within the sectors. By reducing the time the meat segments are in contact with the partitions, the resistance on the meat segments is effectively reduced as the normal forces acting on the meat segments drop until no force exists, at which time the meat segments are completely free from the jerky mold. Such a concept is well known in the art. As such, by configuring the partitions with tapered sides, the meat segments are configured to more easily slide out of the jerky mold. Other means for facilitating may include providing non-stick surface finishing on the various sides of the partitions 34, and any others as recognized by those skilled in the art.

With reference to FIG. 4-B, illustrated is a detailed view of the upper surface 46 of the partition 34 identified in FIG. 4-A. As shown, the upper surface 46 comprises a distance d as measured across from the first side 38 to the opposing second side 42 at the top of the partition 34. The distance d may comprise any distance. For example, the distance d may comprise a distance such that an upper surface area exists, which may be flat or comprise some contour. Alternatively, the distance d may made to result in the first and second surfaces 38 and 42 converging to form a partition having an apex. Such a configuration will result in a much sharper partition that will more easily impale the meat dough. In any event, the distance d is preferably between 0.001 inches and 0.2 inches.

Figure 5:
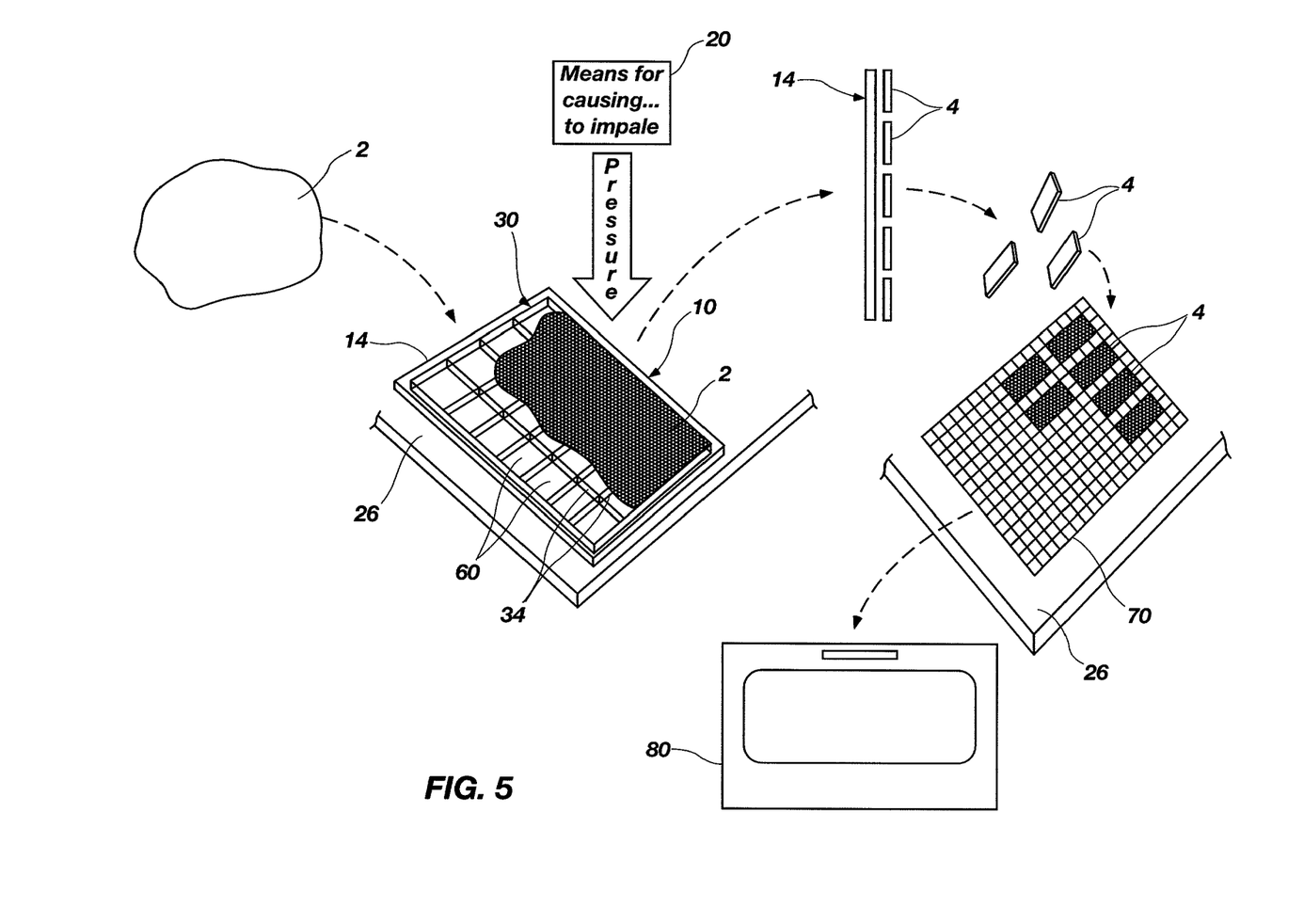
FIG. 5 illustrates a perspective view of a rendition of a method of producing jerky food products, according to one exemplary embodiment of the present invention.

FIG. 5 illustrates a perspective view of a rendition of a method of producing jerky food products, according to one exemplary embodiment of the present invention. As shown, a meat dough 2 is prepared and deposited over a jerky mold 10 having an impaler 30 attached to a backing 14. The impaler 30 comprises partitions 34 configured to define a plurality of sectors 60 arranged in a grid-like pattern. Also, the jerky mold 10 is laid upon a support surface 26, such as a countertop, wherein the jerky mold 10 may be suited for home use. As can be seen, the meat dough 2 preferably comprises a sufficient amount so as to fill each of the sectors 60 in the jerky mold 10. However, this is not necessary as any number of sectors 60 may be used or filled at any given time.

Once deposited onto the jerky mold 10, pressure may then be applied to the meat dough 2 to cause the partitions 34 to impale the meat dough 2 and the meat dough 2, or at least portions thereof, to be received into the sectors 60. The application of pressure is represented by the arrow situated above the meat dough 2 in FIG. 5. Pressure may be applied using any known means for causing 20 the partitions to impale the moldable meat dough. In one exemplary embodiment of a means for causing 20, the meat dough is rolled out over the impaler and compressed using a rolling pin. Using a rolling pin allows the user to evenly distribute the meat dough 2 over the entire jerky mold 10 and to manipulate the meat dough 2 into each of the sectors 60 to form several meat segments 4, each of which are contained within the sectors 60 between the corresponding partitions 34, as well as by the backing 14. The rolling pin also functions to compress or compact the meat dough 2, thus filling and packing the meat dough 2 into the sectors 60 to form the several meat segments 4. Other means for causing 20 the partitions to impale the moldable meat dough may be used, such as the hands of the user, wherein manual manipulation and compression of the meat dough 2 is accomplished. In addition, various utensils, etc. may be used to compress or compact the meat dough 2. In another exemplary embodiment, means for causing 20 may comprise a pressure platen, or other similar flat plate capable of supplying pressure to the meat dough or the partitions. Those skilled in the art will recognize the many ways and means of applying pressure to the meat dough 2 for the intended purpose, namely to cause the impaler 30, and particularly the partitions 34, to impale the meat dough 2, and to cause the meat dough to be received into and to fill the sectors 60.

In light of the meat dough 2 having pressure applied thereto to form the various meat segments, the jerky mold 10 may be considered a compression mold. The term compression mold may be used because the meat dough is advantageously packed into the sectors 60, thus allowing each of the resulting meat segments to comprise a greater volume of meat dough, which ultimately allows the final jerky food product to comprise a denser product or a product having a greater volume.

Once the meat dough 2 is compacted and the sectors 60 of the jerky mold 10 filled to define a plurality of meat segments 4, any excess meat dough 2 is removed from the jerky mold 10. Excess meat dough is preferably removed so as to leave the surface of the several meat segments 4 flush with the top of the partitions 34, thus allowing the meat segments to comprise a thickness that is substantially equivalent to the height of the partitions 34. The excess meat dough may be removed using any device, object, or system known in the art.

Upon removing the excess meat dough, thus leaving the meat segments 4 disposed within the sectors 60 of the jerky mold 10, the meat segments 4 are removed from the jerky mold 10. In the exemplary embodiment shown, the meat segments 4 are removed by lifting the jerky mold 10 off the countertop and turning it upside down. The meat segments 4 either fall out of the sectors 60 under gravity, or with assistance from the user in some way. As discussed above, the jerky mold 10 may comprise means for facilitating the removal of the meat segments 4. In this case, the jerky mold 10 comprises partitions 34 having a tapered configuration. Upon removal of the meat segments 4, the jerky mold 10 may be prepared to receive another batch of meat dough, or it may be cleaned and stored.

The meat segments 4, once removed, are further treated in one or more ways to produce or prepare the jerky pieces that are to be the final jerky food product. Treating the meat segments may involve any number of processes or means for treating. For example, means for treating may comprise marinating, seasoning, drying, cooking, and/or curing the meat segments, as well as any other means known in the art. In the embodiment shown, the meat segments 4 are caused to be disposed on a screen 70, which is configured to support the meat segments in an oven or drying device, such as a dehydrator. FIG. 5 illustrates an exemplary oven 80 configured to receive the screen 70 having the meat segments 4 disposed and supported thereon. The screen 70 comprises a grid-like configuration, preferably made of stainless steel, configured to facilitate the convection of air therethrough to facilitate the drying or cooking of the meat segments 4 to obtain or produce the jerky pieces ready for packaging and/or consumption.

Figure 6:
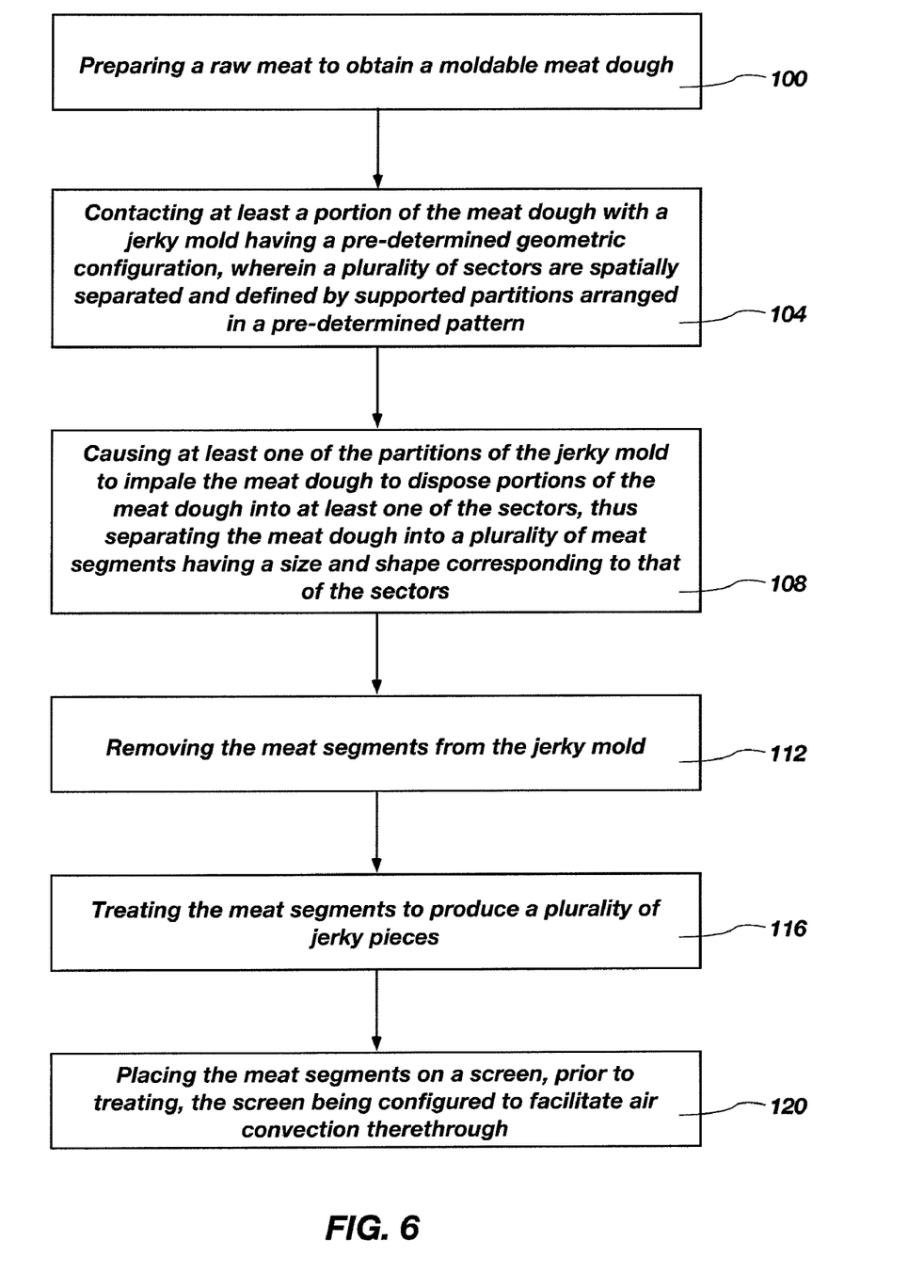
FIG. 6 illustrates a flow diagram of the method shown in FIG. 5.

FIG. 6 illustrates a flow diagram of the method shown in FIG. 5. This particular method of producing a jerky food product comprises several steps. Step 100 involves preparing a raw meat to obtain a meat dough, or a moldable meat dough. As indicated above, the step of preparing comprises blending the meat or meat dough with at least one of seasonings, curing agents, binding agents, flavorants, humectants, stabilizing agents, preservatives, palatability agents, fillers, and/or stabilizing agents. Step 104 involves contacting at least a portion of the meat dough with a jerky mold having a pre-determined geometric configuration, wherein a plurality of sectors are spatially separated and defined by supported partitions arranged in a pre-determined pattern. Step 108 involves causing at least one of the partitions of the jerky mold to impale the meat dough to dispose portions of the meat dough into at least one of the sectors, thus separating the meat dough into a plurality of meat segments having a size and shape corresponding to that of the several sectors. Step 112 involves removing the meat segments from the jerky mold. Step 116 involves treating the meat segments to produce a plurality of jerky pieces, or jerky food products. This step may comprise any known means for treating, such as curing or cooking the meat segments, or adding various spices or seasonings thereto. Step 120 involves placing the meat segments onto a screen, prior to the step of treating, wherein the screen is configured to facilitate the convection of air therethrough.

The following example illustrates one particular method for producing a batch of jerky pieces or jerky food products. The example is intended to be for illustrative purposes only, and should not be construed as limiting in any way.

Example One

Thirty pounds of ground beef and a jerky cure were blended together to form a meat dough. A jerky mold formed from durable plastic material was then obtained. The jerky mold comprised a plastic backing having a flat, planar surface, and a plastic grid of partitions attached to the surface of the backing. The backing comprised a geometric configuration measuring seventeen (17) inches in length, twelve (12) inches in width, and one-quarter (¼) of an inch in depth. The partition grid comprised a geometric configuration measuring fifteen (15) inches in length, ten (10) inches in width, and three-sixteenths (3/16) of an inch in depth was obtained. Also part of the geometric configuration of the jerky mold, the partition grid comprised a series of open, rectangular sectors separated and defined by the partitions. More specifically, the jerky mold featured seven rows and four columns, with each sector being five (5) inches in length and two (2) inches in width. Therefore, the jerky mold was capable of producing twenty eight pieces of jerky at a time.

Each of the partitions comprised opposing edges, with each edge having a tapering configuration (except the perimeter edge of the outermost partition, which was perpendicular to the backing), such that a cross-section of a partition substantially took the form of a triangular shape, with the width or distance of the base being approximately three thirty-seconds (3/32) of an inch, and the two sides converging at an apex, thus forming rather sharp top surfaces of the partitions.

The jerky mold was laid over a flat surface, namely a countertop, and the meat dough was brought into contact with the jerky mold by disposing the meat dough about the upper surface of the jerky mold, and particularly the partitions. A rolling pin was used to distribute the meat dough about the jerky mold and to compact or compress the meat dough. Rolling the meat dough with the rolling pin effectively caused the partitions of the jerky mold to impale the meat dough. As the meat dough was rolled and caused to be impaled, an increase in pressure caused each of the several sectors to be filled and packed with meat dough, thus creating a plurality of meat segments. The backing functioned to successfully contain the meat dough in the sectors. Once all of the desired sectors were filled, the excess meat dough was scraped off of the top surface leaving the plurality of meat segments tightly packed into the sectors of the jerky mold. A screen was obtained and the jerky mold rotated upside down to cause the several meat segments to release from the jerky mold, being facilitated by the tapered configuration of the partitions. Once on the screens, the meat segments were dried and cooked to obtain several finished jerky food pieces or products.

As briefly described above, it is contemplated that the present invention jerky mold and method of manufacturing a jerky food product may also be used within a large-scale manufacturing setting where mass quantities of jerky food products are prepared. In one exemplary embodiment, the jerky mold, namely the partitions, may be disposed about a rotary drum in a similar manner as the rotary mold discussed above. The rotary drum would support the partitions in a manner such that as the rotary drum is caused to rotate, the partitions are caused to impale a meat dough in proximity of the rotary drum. The meat dough may be laid out on a conveyor type surface, or it may be fed substantially vertically down between the rotary drum having the partitions and a corresponding pressure drum. In any event, the meat dough is preferably sheeted prior to its delivery to the rotary drum. The sheeting may be performed between counter rotating rollers or by other methods. Positioned beneath the rotary drum may be a pressing drum or forming roll. A continuous conveyor is supported and fed between the rotary drum and the pressing drum. The continuous conveyor functions to receive the jerky pieces leaving the rotary drum. Of course, other mass manufacturing systems and setups using the present invention jerky mold and impaling methodology are contemplated, each of which will be obvious to those skilled in the art.

The foregoing detailed description describes the invention with reference to specific exemplary embodiments. However, it will be appreciated that various modifications and changes can be made without departing from the scope of the present invention as set forth in the appended claims. The detailed description and accompanying drawings are to be regarded as merely illustrative, rather than as restrictive, and all such modifications or changes, if any, are intended to fall within the scope of the present invention as described and set forth herein.

More specifically, while illustrative exemplary embodiments of the invention have been described herein, the present invention is not limited to these embodiments, but includes any and all embodiments having modifications, omissions, combinations (e.g., of aspects across various embodiments), adaptations and/or alterations as would be appreciated by those in the art based on the foregoing detailed description. The limitations in the claims are to be interpreted broadly based on the language employed in the claims and not limited to examples described in the foregoing detailed description or during the prosecution of the application, which examples are to be construed as nonexclusive. For example, in the present disclosure, the term "preferably" is non-exclusive where it is intended to mean "preferably, but not limited to." Any steps recited in any method or process claims may be executed in any order and are not limited to the order presented in the claims. Means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are expressly recited. Accordingly, the scope of the invention should be determined solely by the appended claims and their legal equivalents, rather than by the descriptions and examples given above.

The invention claimed is:

1. A method for preparing a jerky food product, said method comprising:
preparing a raw meat to obtain a moldable meat dough;
contacting at least a portion of said meat dough with a jerky mold having a pre-determined geometric configuration, wherein a plurality of sectors are spatially separated and defined by ported partitions arranged in a pre-determined pattern;
causing at least one of said partitions of said jerky mold to impale said meat dough to dispose portions of said meat dough into at least one of said sectors, thus separating said meat dough into a plurality of meat segments;
causing said meat dough to contact a backing that provides a temporary stop to said meat dough to prevent said meat dough from passing through said sectors as said meat dough is impaled and disposed into said sectors and that is separable from said partitions to provide an exposed surface to release said meat dough;
removing said meat segments from said sectors of said jerky mold; and
treating said meat segments to produce a plurality of jerky pieces.

2. The method of claim 1 further comprising compressing said meat dough to cause said meat dough to be packed into and to fill said sectors, said meat segments having a size and shape corresponding to that of said sectors.

3. The method of claim 1, further comprising bounding one of an upper and lower surface of said jerky mold with a flat surface prior to said contacting, said flat surface functioning as a boundary to contain said meat dough in said sectors upon being disposed therein.

4. The method of claim 3, wherein said bounding comprises attaching said backing to said partitions, wherein said flat surface is part of said backing.

5. The method of claim 3, wherein said bounding comprises laying said partitions on an independent support surface.

6. The method of claim 1, wherein said contacting comprises disposing said meat dough over said jerky mold as laid on a flat surface.

7. The method of claim 1, further comprising configuring said jerky mold to comprise a grid-like configuration, with each of said sectors being substantially of equal size and shape.

8. The method of claim 1, further comprising configuring said jerky mold with means for facilitating the removal of said meat segments therefrom.

9. The method of claim 8, wherein said means for facilitating is selected from the group consisting of tapered edges formed on said partitions, a non-stick surface finish formed on said partitions, and any combination; of these.

10. The method of claim 1, wherein said causing said partitions of said jerky mold to impale said meat dough comprises applying pressure sufficient to cause said meat dough to be packed into and fill least one of said sectors.

11. The method of claim 1, wherein said causing said partitions of said jerky mold to impale said meat dough comprises rolling said meat dough with a rolling pin.

12. The method of claim 1, further comprising sheeting said moldable meat dough in preparation for large-scale manufacture of jerky food products.

13. The method of claim 12, wherein said jerky mold is disposed about and configured to operate with a rotary drum that is operable within a large-scale manufacturing system, said rotary drum being configured to receive said sheeted meat dough.

14. The method of claim 13, wherein said contacting comprises said sheeted meat dough contacting said rotary drum.

15. The method of claim 13, wherein said causing comprises said jerky mold, as disposed about said rotary drum, impaling said sheeted meat dough in a continuous manner so as to produce a large number of jerky food products.

16. The method of claim 1, wherein said jerky mold is substantially planar, and wherein upper and lower portions of the impaler are open.

17. The method of claim 1, wherein:
   said jerky mold is substantially planar, and wherein upper and lower portions of the impaler are open;
   causing at least one of said partitions of said jerky mold to impale said meat dough comprises pressing said meat dough downward onto said jerky mold from above said jerky mold;
   causing at least one of said partitions of said jerky mold to impale said meat dough comprises containing said meat dough within said jerky mold; and
   wherein the method further comprises inverting a position of said jerky mold with said meat dough contained therein prior to removing said meat segments.

18. A method for facilitating the preparation of a jerky food product, said method comprising:
   arranging a plurality of partitions in a pre-determined pattern to form a plurality of spatially separated sectors, said partitions being configured to impale a moldable meat dough;
   supporting said partitions to form a jerky mold; and
   configuring said jerky mold to receive said meat dough and to facilitate packing of said meat dough into said sectors against a backing that provides a temporary stop to said meat dough to prevent said meat dough from passing through said sectors as said meat dough is impaled and disposed into said sectors and that is separable from said partitions to provide an exposed surface to release said meat dough;
   said jerky mold to be used to form a plurality of meat segments to be treated to produce a plurality of jerky pieces.

19. The method of claim 18, wherein said supporting comprises bounding said partitions with a perimeter support structure, and wherein said supporting comprises coupling said backing to said partitions.

20. The method of claim 18, wherein said supporting comprises attaching said partitions to said baking having a flat, planar surface configured to back said partitions and to contain said meat dough within said sectors upon receipt of said meat dough therein.

21. A method for preparing a jerky food product, said method comprising:
   preparing a raw meat to obtain a moldable meat dough;
   contacting at least a portion of said meat dough with a jerky mold, said jerky mold having an impaler with a plurality of interconnected, supported partitions having an upper surface and opposing edges, the partitions being adapted to impale said moldable meat dough, a plurality of sectors spatially separated from one another and having a pre-determined configuration and defined by said partitions being arranged in a pre-determined pattern that separates said meat dough into a plurality of meat segments having a size and shape corresponding to that of said sectors, and a backing removably attar attached to said impaler and supporting said impaler, wherein said backing provides a temporary stop to said meat dough to prevent said meat dough from passing through said sectors as said meat dough is impaled and received into said sectors, and that subsequently releases from said impaler to provide an exposed surface to release said meat dough from said impaler;
   causing said impaler of said jerky mold to impale said meat dough to dispose portions of said meat dough into at least one of said sectors, thus separating said meat dough into a plurality of meat segments;
   removing said meat segments from said sectors of said jerky mold; and
   treating said meat segments to produce a plurality of jerky pieces.

* * * * *